June 23, 1942.  A. BARBAGELATA  2,287,594

TELLURIAN

Filed March 25, 1941  4 Sheets-Sheet 1

INVENTOR
ANGELO BARBAGELATA
BY
A. M. Weller
ATTORNEY

June 23, 1942.   A. BARBAGELATA   2,287,594
TELLURIAN
Filed March 25, 1941   4 Sheets-Sheet 4

INVENTOR
ANGELO BARBAGELATA
BY
ATTORNEY

Patented June 23, 1942

2,287,594

UNITED STATES PATENT OFFICE 2,287,594

TELLURIAN

Angelo Barbagelata, Matawan, N. J.

Application March 25, 1941, Serial No. 385,051

9 Claims. (Cl. 35—45)

The present invention relates to an astronomical clock and, more particularly, to a tellurian for continuously indicating the position of the earth in its orbit about the sun and data relative thereto.

Astronomical clocks and devices for revolving one globe about another in simulation of the earth's annual revolution about the sun have been known for many years. Some of these devices were relatively primitive from an astronomical viewpoint and were designed merely to show the gross movements of the earth and its satellite, the moon, in the solar system. Thus, they failed even to provide an elliptical orbit for the earth's path, and none of the prior art devices with which the applicant is acquainted provided means of correcting for variations in speed of the earth in its travel during different seasons of the year.

It is an object of the present invention to provide a device for actually simulating the movement of the earth in its orbit about the sun whereby an improved educational instrument capable of use in schools, museums and homes as an aid in the study of astronomy is provided.

It is another object of the invention to provide a tellurian for continuously indicating the date, the solar time anywhere on earth and the civil time whereby an instrument capable of operation in hotels, steamship and railway offices and travel agencies to show the relationship and differences between times at any points on the earth for the interest of tourists can be provided.

It is a further object of the invention to provide a tellurian upon which direct readings of the hour of the day, both civil and solar, and the date are furnished, whereby a continuous clock and calendar for general use is provided.

Another object of my invention is to provide a device having an earth-simulating globe revolving in an elliptical orbit about a sun-simulating globe, said orbit being patterned upon the actual orbit of the earth about the sun.

My invention also contemplates the incorporation of means for tilting the earth-simulating globe at a correct angle of inclination to its path or orbit and means for maintaining said angle during its revolution in said orbit, so that the upper or north pole of the globe is tilted toward the sun during the northern summer and away from the sun during the northern winter.

It is also within the contemplation of my invention to provide a device having a globe adapted to make one revolution in its orbit in exactly 365 days, 5 hours, 48 minutes, such period being equivalent to an astronomical year, the speed of travel of said globe being so regulated as to diminish from March 21st to September 22nd and to increase from September 22nd to March 21st, thereby taking a longer time in passing from the vernal to the autumnal equinox than the time required in going from the autumnal equinox to the vernal equinox in imitation of the actual progress of the earth in its orbit.

The invention further purposes to incorporate in a tellurian, gears which can be alternatively employed for speeding up the operation of the device for demonstration purposes whereby movement equivalent to a day's time can be shown in approximately one-half minute.

Still another object of this invention is to provide means in a tellurian for rotating an earth-simulating globe in proportion to the actual rotation of the earth whereby such rotation of the globe is accomplished in one solar day, said solar day varying from the civil day by from 0 to about 16 minutes, depending upon the day of the year.

My invention further provides means in a tellurian for revolving a moon-simulating sphere about the earth-simulating globe, such means being adapted to cause such revolution 235 times in 19 years, a figure which introduces a practically negligible discrepancy as regards the actual speed of travel of the moon about the earth.

Other objects and advantages of the present invention will be apparent from the following description, taken in conjunction with the accompanying drawings, in which:

Broadly stated, the present invention comprises a metal casing, the periphery of which is a rough representation of the earth's orbit. An object, such as an electric light bulb, is placed upon the approximate center of this casing to represent the sun, and an earth-simulating globe is adapted to revolve about this sun in exactly one astronomical year. An electric clock of conventional design is positioned near the center of the device and is operated by a small synchronous motor, such as is in general use. A novel combination of cams, gears and shafts for proportioning the travel of the earth-simulating globe to that of the earth about the sun is also operated by this motor. Means are also provided for rotating the earth-simulating globe about its axis once a day and for revolving a moon-simulating sphere about said globe in substantially the time required by the moon itself in its progress around the earth. A pair of alternatively operated gears in reverse position to each other is furnished so that my tellurian can be affixed either to floor or to ceiling. My device is preferably provided with extra gears for running the same at an increased or demonstrating speed and with a conventional clutch mechanism for putting these gears in operation.

My invention is adapted to provide a correct mechanical representation of the actual movement of the earth about the sun and, incidentally, of the moon about the earth. Since the axis of the earth is tilted with respect to the plane of its orbit and since the angle of inclination thereby formed is always in a certain direction in space, it is apparent that this angle will seem to vary with respect to the sun as the north pole of the axis inclines first toward the sun at the northern summer solstice, then gradually changes position to be tilted away from the sun at the winter solstice, and gradually returns to its former position until it is finally tilted toward the sun again at the next summer solstice. For a correct representation of this phenomenon, it was necessary to provide means for holding my earth-simulating globe at a constant angle with respect to the casing during its revolution about the sun-simulating globe, and such means has been provided, as will be discussed infra.

A feature of my invention is the provision of means for varying the speed of travel of the earth-simulating globe in its progress around the periphery of the casing. These means are adapted to correct the velocity of revolution so that the globe's position at any day of the year accurately represents the position of the earth in its celestial orbit. Since the velocity of the earth's progress in its orbit varies, even from day to day, it is apparent that the length of a solar day will also vary, as measured by civil time. It is another feature of my device to provide a means for directly reading the solar time for any point upon the earth at any hour of the day on any day of the year.

Referring to the figures in the drawings, wherein like reference characters designate similar parts throughout, I have indicated a substantially circular casing by numeral 1. The casing has a base 2, which supports a rotatable platform 2a, and said casing is provided with a flanged edge 3 and an annular track 4 within its periphery. A synchronous motor 5 is affixed to the platform 2a, which also bears an electric clock 6. The frame 6a of the clock is bolted to the platform, and a horizontal shaft 7 rotatably mounted in said frame has one of its ends held in the chuck 8 of the motor.

Figures 2, 3:
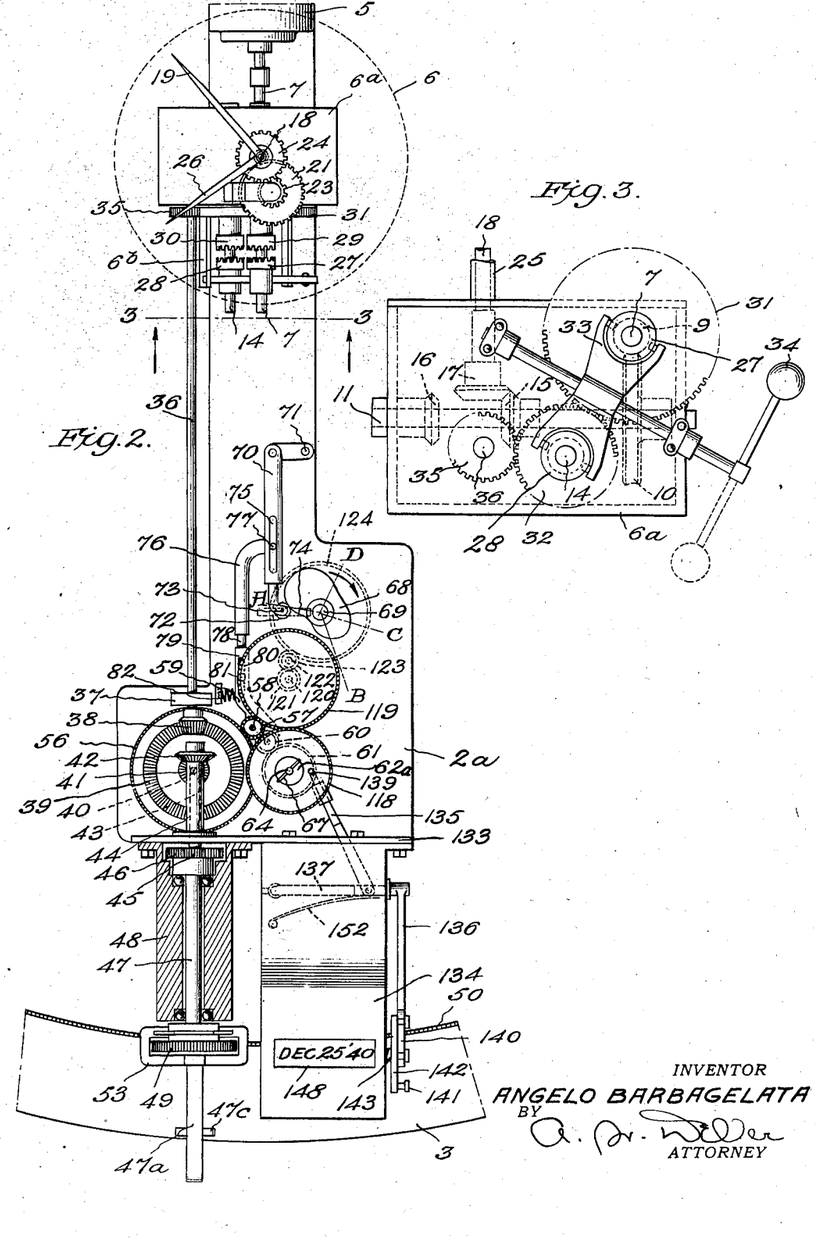
Fig. 2 illustrates a plan view of a portion of my invention.
Fig. 3 shows a detailed sectional view, looking in the direction of the arrows at line 3—3 of Fig. 2, with some parts displaced for greater clarity.

The electric clock used to operate the tellurian of my invention may be of conventional design. A worm gear 9 is fixedly mounted upon the shaft 7 and meshes with the teeth of a spur gear 10 mounted upon another horizontal shaft 11 rotatably mounted in the frame 6a in transverse position to shaft 7. Gear 12 is also fixedly attached to shaft 11 and meshes with a worm gear 13, which is fixedly mounted upon a shaft 14, said shaft 14 being rotatably mounted in the frame parallel to shaft 7. A bevel gear 15 is also attached to shaft 11, and a similar bevel gear 16 is mounted opposite thereto and in reverse position upon the same shaft. One of these gears (in this case, gear 15, as shown in Fig. 3) meshes with a bevel gear 17 attached to a vertical shaft 18. The purpose of the two gears 15 and 16 is to provide means for alternatively rotating shaft 18 in either direction, depending upon whether the clock is located upon floor or ceiling. Attached to shaft 18 is a minute hand 19 of a clock. A small gear 20 is also fixedly mounted upon shaft 18, and this gear meshes with a large gear 21 which is fixed to a rotatable pin 22 positioned in the top of the frame 6a. Upon this pin 22, a small gear 23 is also mounted, and this gear meshes with a large gear 24. Gear 24 is loosely and rotatably mounted upon shaft 18, and a sleeve 25 is attached thereto. An hour hand 26 is fixedly mounted upon said sleeve. The gears described are so proportioned that minute hand 19 makes a single revolution every hour and the hour hand 26 makes a revolution each 12 hours, the two hands thus producing an ordinary clock and indicating the civil time upon a face plate.

A conventional clutch arrangement is provided for permitting operation of my device at two different speeds. The normal speed corresponds with the annual movements of the earth in its orbit about the sun, while a high speed for demonstration purposes is approximately 3,000 times as fast. As has been noted, my clock mechanism comprises two separate parallel, horizontal shafts 7 and 14. A coupling 27 is keyed in longitudinally movable but non-rotatable position upon shaft 7, so that it can rotate only with said shaft. Similarly, a coupling 28 is mounted in like fashion upon shaft 14, rotating only when shaft 14 is turned. As has been explained supra, shaft 14 is geared to the clock mechanism through worm gear 13 and is rotated thereby. Two other couplings 29 and 30 are respectively positioned upon shafts 7 and 14 and are not keyed thereto so that they are rotatable upon the shafts. Coupling 29 is attached to gear 31, which also rotates freely on shaft 7, and, in similar manner, coupling 30 is attached to gear 32, which rotates freely on shaft 14. A clutch 33 is mounted on frame 6a by means of brackets 6b and engages slots in the couplings 27 and 28. A handle 34 is attached to said clutch for turning the same to right or left, movement to the right causing coupling 27 to mesh with coupling 29 and movement to the left causing coupling 28 to mesh with coupling 30 while uncoupling 27 and 29. It will be observed that, when coupling 28, which is slowly rotated by shaft 14, meshes with coupling 30, gear 32 is turned at a low speed. When, however, coupling 27 is meshed with coupling 29, large gear 31 is rotated at the higher rate of speed of shaft 7. Moreover, gear 32 meshes with gear 31 and, being smaller than said gear 31, rotates at a still higher rate of speed. Gear 32 also meshes with gear 35, which is fixedly mounted upon driving shaft 36 of my astronometer mechanism, said shaft 36 being in parallel spaced position to shaft 14. Thus, when the coupling 28 meshes with the coupling 30, the mechanism is run at the normal speed of a single revolution of the earth around the sun in one year, whereas, when coupling 27 meshes with coupling 29, the mechanism is run at a demonstration speed of approximately one day in a half minute.

Figure 8:
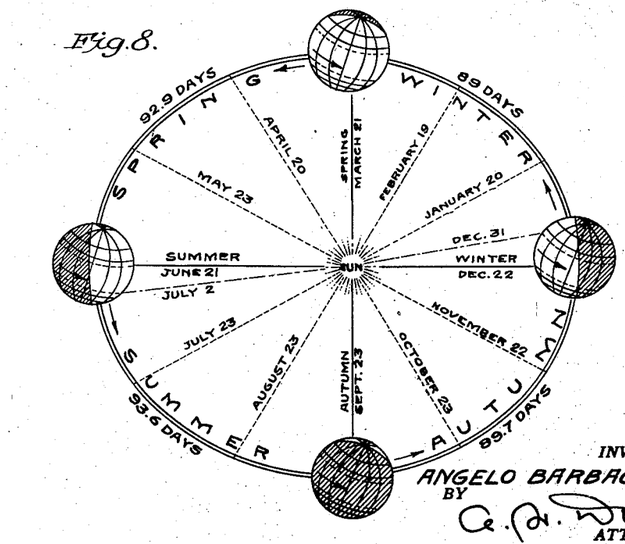
Fig. 8 illustrates the position of the earth-simulating globe in its orbit or path of travel at various times of the year.

Referring to Fig. 2, it will be observed that the rotation of shaft 36, which is supported by a sleeve mounting 37 attached to the platform 2a, causes a bevel pinion 38, fixedly attached to the end of the shaft to turn. The bevel pinion meshes with an annular bevel gear 39, which is fixedly mounted upon a vertical shaft 40 supported by the casing. A smaller bevel gear 41 is also mounted upon the shaft 40 and meshes with a bevel gear 42 attached to one end of a shaft 43. The shaft 43 is supported in a sleeve 44 which is bolted to the platform 2a. At the other end of the shaft 43 is a gear 45 which meshes with a larger gear 46 attached to a shaft 47. The shaft 47 is supported within a bushing 48, and a pinion 49 is attached to the end of said shaft and moves along a rack 50 at the top of the annular track 4. The gears are so proportioned that, when coupling 28 meshes with coupling 30 as described supra, a single passage of pinion 49 around the entire rack 50 takes exactly one solar year. Similarly, when coupling 27 meshes with coupling 29, the trip around the rack 50 of pinion 49 takes only about 1/3000 of this time. It will be understood that the platform 2a revolves about the center of the casing in the same time that it takes gear 49 to revolve about the rack. Below the platform 2a and rotatable therewith, there is a bar or carriage 51, which is cast with the platform and is also supported by the base 2 of the casing. The axis of rotation of the carriage is slightly off center, as the sun does not occupy the center of the earth's orbit. Consequently, a vertical shaft 52 is provided in slightly off center position to serve as the axis of rotation of the carriage 51. Reference to Fig. 8 will indicate the position of this shaft in the relation of the sun to the earth's orbit there shown. It will also be observed at Fig. 8 that, as the radius of rotation changes in length from season to season, the speed of the earth's revolution about the sun increases or decreases, so that the number of days in each season varies. Since the constant changing of radius would have the effect of running pinion 49 off the rack 50, pinion 49 is keyed to shaft 47 in such manner that it is longitudinally movable along said shaft, although radially fixed thereto and rotatable only with the shaft. A guide 53 is slidably mounted in a slot 48a in bushing 48 and is positioned around pinion 49 to limit the movement of the pinion along the shaft. A pin 54 is attached to the lower side of the guide 53 at each side of the annular track 4, and rollers 55 are mounted upon said pins to make rolling contact with the track and keep the guide in fixed position relative thereto. As the platform 2a and carriage 51 revolve, the guide, being held adjacent to the track, keeps pinion 49 in mesh with the rack, the guide and pinion sliding in and out upon shaft 47 and bushing 48 as required. Shaft 47 is supported as described by bushing 48, and a bracket 47a is affixed to the upper part of the bushing. The bracket curves out and downward beyond the annular track 4 and has two horizontal pins 47b attached thereto. A roller 47c is mounted on each pin, and the rollers are spaced apart to make rolling contact with the upper and lower sides, respectively, of the flanged edge 3 of the casing.

In this manner, it is possible to vary the length of time required for covering the different seasons of the year, as determined in the relation of the earth to the sun during the travel in its orbit. Thus, the distance traversed from the date of the summer solstice, say June 21 (see Fig. 8), to the date of the autumnal equinox, about September 23, is greater than the distance traversed between the autumnal equinox and the winter solstice, around December 22. The two distances thus take about 93.6 days and about 89.7 days, respectively. From the time of the winter solstice to that of the vernal equinox, the distance is still less and requires only about 89 days to traverse, while from the date of the vernal equinox, about March 21, to the summer solstice, the distance again increases and the earth makes the trip in about 92.9 days.

Figures 4, 5, 6:
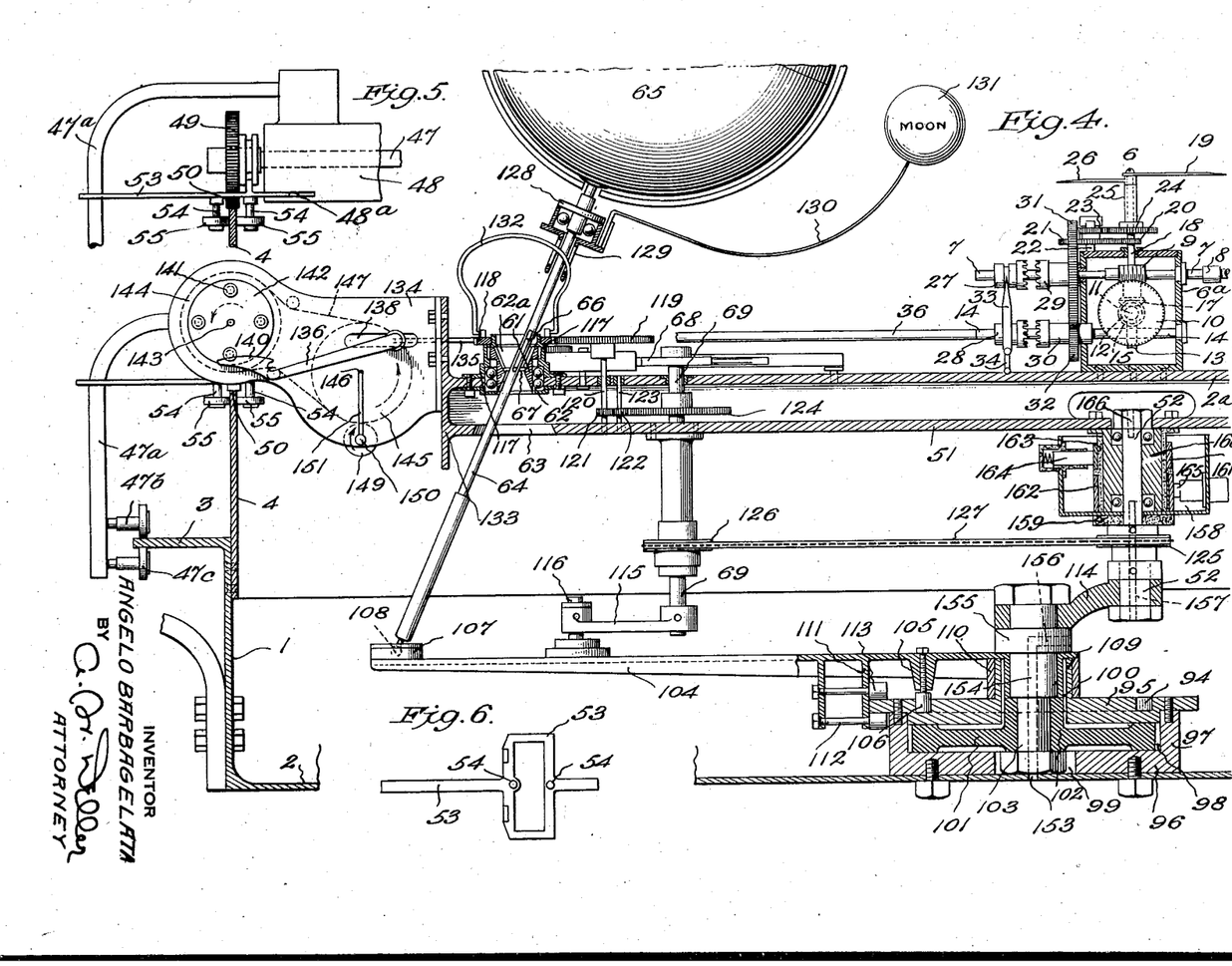
Fig. 4 depicts a vertical cross-section of my invention, partly fragmented.
Figs. 5 and 6 are sectional views, respectively elevational and plan, of part of the globe travel speed control mechanism.

A large gear 56 is also attached to the vertical shaft 40, and said gear engages with a small gear 57 mounted upon a vertical pin 58. A bell crank 59 is also pivoted upon the vertical pin 58, and a small gear 60 on one arm of the bell crank engages with gear 57. Gear 60 also engages with a hollow gear 61 which is rotatably mounted upon bearings within a port 62 upon the platform 2a. There is a port 62a in gear 61 and a port 63 in vertical alignment therewith, but somewhat larger, in the carriage 51. A rod 64 passes through these ports and acts as a support for an earth-simulating globe 65. Near the point of its passage through port 62, the rod 64 has a slot 66, through which passes a diameter pin and ball 67, as seen more clearly at Fig. 4. It will be appreciated that, as the gear 61 rotates, it turns the rod 64 and the globe 65 with it, the ratios of the gears being such that the globe 65 rotates 365.25 times a year, which is equivalent to 365 days, 5 hours, 48 minutes in each revolution of the carriage 51 upon the annular track.

It is apparent that, since the rotation of gear 61 is governed directly by the clock mechanism, the rotation of globe 65 would be kept at constant speed, thus synchronizing solar time with civil time if no correction were made therefor. However, since solar time and civil time coincide at only 4 moments during the year and differ from one another for the remainder of the year, by a differential of from 0 to about 16 minutes per day, it is necessary to apply a corrective measure to increase or decrease the rotational speed of the earth for the purpose of producing the correct solar time. For accomplishing this purpose, I have provided a cam 68 (see Fig. 2) which is so shaped that the distance from the axis of rotation to the outer periphery at each point is proportional to the difference in time between civil and solar time for each day of the year.

The cam 68 is mounted upon a vertical shaft 69 which, through the gears, is adapted to make one revolution per year. Mounted upon the platform 2a adjacent said cam, there is a rod 70 pivoted at one end upon a pin 71 attached to said platform. The rod 70 is jointed at a midsection thereof and at its other end carries a roller 72 having a vertical axis 73 which extends through the rod. Said vertical axis operates in a straight slot 74 in the platform 2a, said slot extending in the direction of shaft 69. In this manner, the lateral movement of the roller is confined to a single direction and it is positioned to make contact with the periphery of cam 68. The rod 70 also has a slot 75 therein, and an L-shaped lever 76 has a pin 77 at the end of one of its arms adapted to move in slot 75 and to be guided thereby. The other arm 78 of lever 76 fits into a sleeve 79 in the arm of bell crank 59 opposite to that upon which the small gear 60 is positioned. The sleeve 79 has a slot 80 therein, and a set screw 81 located in arm 78 protrudes through slot 80 to keep the lever in fixed position within the sleeve. A compression spring 82 is attached to the bell crank and, through lever 76, presses down upon rod 70 to keep the roller 72 in contact with cam 68.

The cam, as aforesaid, is designed to correct for the differences between solar and civil time at any day of the year and is therefore shaped in such manner as will be apparent to those skilled in the art. A representation of the same is seen at Fig. 2, and it will be observed that there are 2 points at which civil time is at a maximum interval ahead of solar time and, similarly, two points at which civil time will reach a maximum behind solar time. Between these 4 points, there will be 4 other points during the course of the year when civil time and solar time will coincide; these latter 4 points are represented by the letters A, B, C and D in the figure.

In operation, therefore, when cam 68 turns from A to B in the direction of the arrow, as shown, roller 72 first moves toward the center of the cam; since rod 70, lever 76 and bell crank 59 are free to move except at the pivot points 58 and 71, the bell crank 59 swings about the vertical pin 58 and causes gear 60 to rotate gear 61 a slight amount in a counter-clockwise direction. Since this is in a direction opposite from that in which it is being normally rotated, gear 61 is thus retarded and solar time is made to lag behind civil time by a proportionate amount. After the roller 72 has passed the minimum point on the cam, it is pushed away from the center of the cam and causes gear 60 to move back; this has the effect of advancing gear 61 in a clockwise direction in excess of its normal rotation, and solar time thus catches up to civil time when point B is reached. Beyond point B, the rotation of the earth is still farther advanced until the maximum point is reached, and from there on it is retarded until civil time and solar time coincide again at point C. In this manner, gear 61, which directly rotates globe 65, is either advanced or retarded to reproduce the actual movement of the earth and to proportion the rotation of said globe 65 to the correct solar time.

Figure 1:
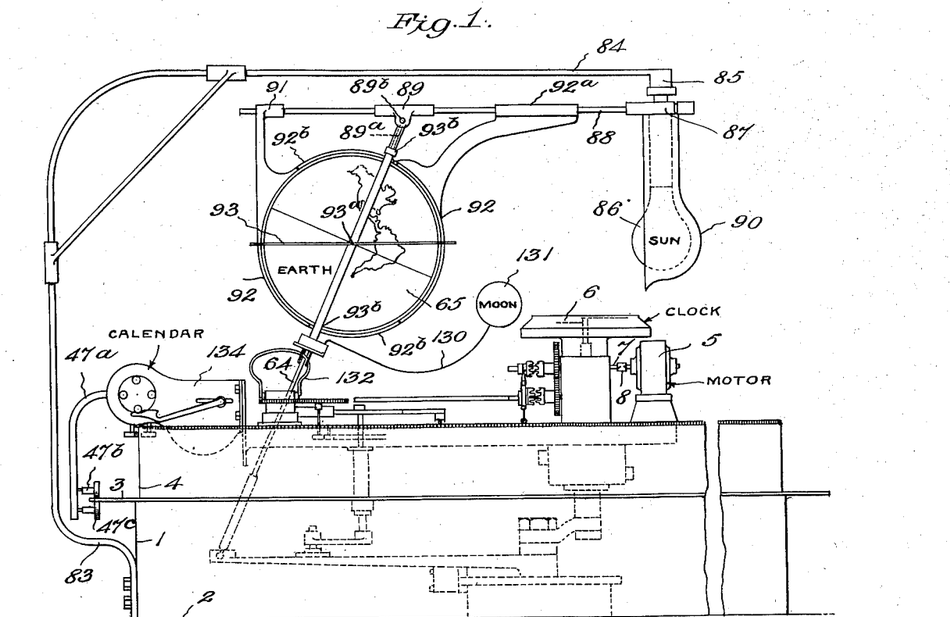
Fig. 1 is an elevational view of my device, partly fragmented.

I have provided means in my device for directly reading the solar time at any point on the earth's surface at any time during the day and on any day of the year. As shown at Fig. 1, a bracket 83 is bolted to the outside of casing 1, and a horizontal rod 84 extends over the entire device. The rod 84 has a vertical arm 85 at its end, and suspended therefrom is a conventional electric bulb 86 which serves as a sun-simulating globe. The rod 84 and the globe 86 always remain in fixed position.

A bearing 87 is rotatably mounted upon the arm 85 and a horizontal rod 88 is fixedly attached thereto. Rod 83 moves on bearing 87 about arm 85 once a year with the globe 65, and slides freely in bearings 92a, 89 and 91. Of these bearings, 92a and 91 are rigidly connected with or are integrally formed with ring 92. Ring 92 has two segmentary slots 92b provided therein, through which rod or shaft 64, upon which globe 65 is mounted, extends. Slots 92b determine the position of ring 92 with respect to rod 64 so that the ring cannot move laterally on the rod 64 but it is free to move longitudinally on the upper and lower side of the globe. Dial 93 is secured to ring 92 and is fastened to cross ring 93b by means of pins 93a so that the dial is free to move up and down on the outer sides with 91, 92 and 92a. Cross ring 93b is secured at the upper and lower side of the globe on rod 64, leaving the same free to turn. The upper end of rod 64 has a socket 64a formed therein into which extends a short shaft 89a jointedly connected with bearing 89 by means of a pin 89b, thereby forming a universal joint for the upper end of rod 64. Rod 88 keeps the complete structure 91, 89, 92a and also ring 92 in the same position with respect to the horizontal, with the exception of the globe 65, which by moving constantly dial 93 on the autumnal equinox will be right straight on equatorial line.

Attached to the bearing 87, there is a lamp shade 90 which shields part of the electric bulb 86. The lamp shade is so positioned as to have the light from globe 86 shine directly upon globe 65, and it will be observed from the construction set forth supra that, as globe 65 revolves in its orbit, rod 38, bearing 87 and shade 90 must turn with it, causing the light always to shine upon the part of the earth-simulating globe 65 which faces the sun simulating globe 86.

When the globe 65 reaches the winter solstice, the dial 93 will reach nadir 23° 27' and will move gradually up, reaching the vernal equinox straight in the equatorial line on the 21st of March. From March 21 it will continue its constant movement reaching zenith 23° 27' on the 21st of June. Dial 93 is divided into 24 equal sections and indicates the sun line solar time at any part of the globe, and ring 92 indicates constantly the meridian. The solar time sun line and meridian indicators stand always horizontal, while globe 65 continuously changes its position from season to season and from day to day.

The revolution of the platform 2a with the carriage 51 upon the annular track 4 would cause the earth-simulating globe 65 to revolve in a true circle and would thus not be representative of the real orbit of the earth's movement. I have provided means for producing this elliptical path of the earth by cutting a grooved track 94 in a stationary plate 95, which is bolted to the base 2. This grooved track is exactly proportioned to the elliptical orbit taken by the earth in its celestial movement about the sun. The stationary plate 95 is bolted to a base plate 96, which is itself bolted to the base 2. The base plate has a high annular shoulder 97 upon the top of which the stationary plate 95 is fastened to provide a recess 98 between the two plates. In the center of the base plate there is a port 99, and I have provided a corresponding port 100 in the center of the stationary plate 95. Located in the recess 98 there is a disc 101 having a hollow hub 102 extending through the ports 99 and 100. Disc 101 is of sufficient thickness to be snugly confined vertically in the recess, but there is sufficient lateral tolerance to permit slight movement in a horizontal direction in the amount required by the elliptical groove 94, as will be described infra.

A shaft 103 runs through ports 99 and 100 and the hollow hub 102. One end of a lower bar 104 is also freely mounted upon said shaft, and this bar is rigidly bolted to the hub 102. Bar 104 has a spur 105 thereon to which is fixed a roller 106. Said roller is adapted to revolve in a grooved track 94. At the other end of bar 104 there is a socket 107 in which is engaged a ball 108 at the lower end of rod 64. The rod 64 has been described as passing from globe 65 down through port 63 in carriage 51. The ball 108 at its lower end is adapted to provide a universal joint in the socket 107.

The stationary plate 95 is provided with a raised shoulder 109 surrounding the port 100, and a bushing 110 adapted to turn freely upon this shoulder has two flat faces upon the outside thereof which act as guides for the lower bar 104. In this manner, the movement of the bar 104 is confined to a direction longitudinal the bar and not lateral thereto. As the bar revolves and is pulled out or is pushed in by roller 106 riding in the elliptical track 94, the bushing 110 keeps the movement in line. The bar is prevented from vertical movement, either up or down, by provision of an extension piece 111 which is attached thereto and which carries two horizontal pins 112. Upon each pin a roller 13 is rotatably mounted, and the pins are so spaced apart from each other that the rollers make contact, respectively, with the upper and lower sides of the edge of stationary plate 95.

Figure 7:
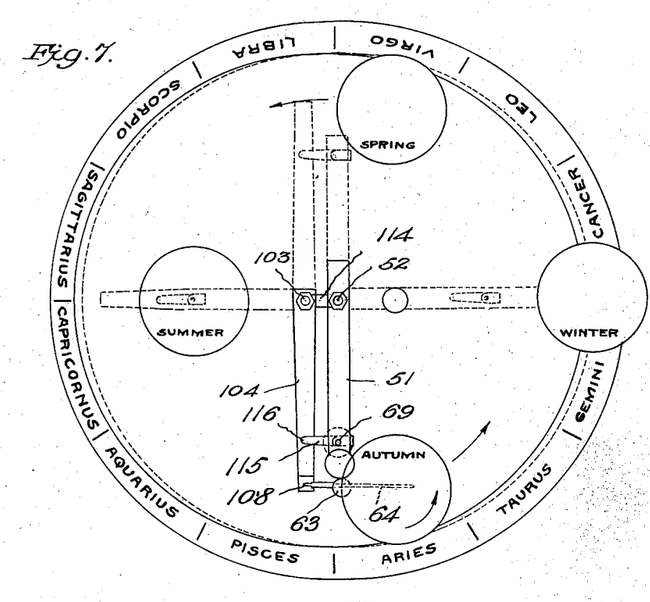
Fig. 7 is a plan view of a lower portion of my device with the earth-simulating globe superimposed thereon in four different positions to represent the four seasons of the year.
Figure 9:
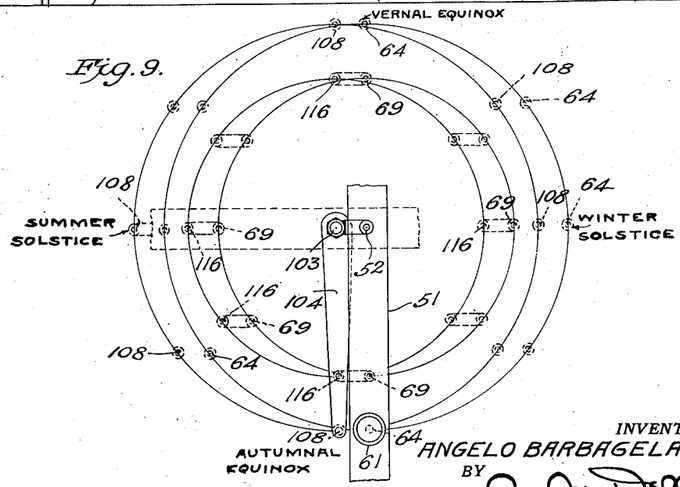
Fig. 9 represents the movement of elements of my device during the course of a single rotation of the earth-simulating globe about the sun-simulating globe.

It has been pointed out infra that the angle of inclination of the axis of the earth to the plane of its orbit remains the same in space during the entire revolution of the earth about the sun. It has also been noted that, as a consequence thereof, the relationship of this angle of inclination to the position of the sun constantly changes. To take care of this phenomenon, I have provided the carriage or upper bar 51 and the lower bar 104, as described supra. The relative positions of the two bars at the two equinoctial and two solstitial points is shown at Figs. 7 and 9, where it will be observed that bar 104 is directly beneath bar 51 at the summer solstice. This position is the one illustrated at Fig. 4. As the earth-simulating globe moves toward autumn, the angle of inclination of the globe 65 toward the sun-simulating globe 86 would remain the same, if the two bars were permitted to continue directly one above the other. The bars are therefore slowly separated, so that the inclination angle may remain constant and the relationship to bulb 86 may continuously change. Means are therefore provided for carrying out this separation to the end that, when the autumnal equinox is reached, the positions of bars 51 and 104 with respect to each other will be as shown by the full lines at Figs. 7 and 9.

The means for separating bars 51 and 104 from their position one above the other and for maintaining a proper angle of inclination for globe 65 will now be described. One end of a bar 114 is fixedly mounted upon the upper end of shaft 103. Its other end is fixedly mounted upon the lower end of shaft 52, heretofore described. A similar bar 115 of the same length has a sleeve at one end fixedly mounted upon shaft 69, and the bearing at the other end of bar 115 is mounted upon a pin 116 which is journaled in bar 104.

As the platform 2a and upper bar 51 move annually around track 4, shaft 69 is carried along. Shaft 69 is tied to pin 116 through bar 115, so that the pin is also carried along and caused to be displaced about shaft 69. Since pin 116 is journaled in bar 104, this, of course, has the effect of moving bar 104 out of its solstitial position of vertical alignment with bar 51. The inclination of globe 65 is consequently regulated, due to the fact that rod 64 is pivoted at the end of bar 104.

As it will be best observed in Figs. 1 and 9, members 108 and 64 never revolve about each other, same as members 116 and 69 never revolve about each other. Member 108 follows member 64 always parallel in order to keep the globe tilted in the same direction, and the same applied to 116 and 69. All of these members revolve once a year around shaft 52, which also makes one revolution a year. The globe rotates 365 times 5 hours and 48 minutes around shaft 52 plus one rotation on itself making 366 times 5 hours and 48 minutes.

Shafts 52 and 69 are provided with sprockets 125 and 126, respectively, and a chain 127 engages the two sprockets. The chain and sprocket mechanism which I have provided is to avoid any tendency toward stalling of the mechanism and backward rotation when the bars 51 and 104 are in vertical alignment, as occurs at the summer solstice, June 21st, and at the winter solstice, December 22nd.

A large gear 124 is fixedly attached to the shaft 69 and rotates once a year with said shaft. A shaft 123, journaled in bar 51 and platform 2a, is in parallel-spaced position to shaft 69 and carries a gear 122 fixedly mounted thereon. Gear 122 engages with large gear 124 and also with gear 121, which is fixedly mounted upon shaft 120 journaled in bar 51 and the platform in parallel position to shaft 69. A gear 119 is also fixedly mounted upon shaft 120, and this gear makes engagement with a moon gear 118. I have described gear 61, through which rod 64 extends, as having a port 62a. Gear 61 is mounted upon ball bearings within a bushing 117 in port 62 of platform 2a. Upon the top of this bushing, the moon gear 118, a large annular gear, is rotatably mounted.

A bearing 128, having a projection 129 depending therefrom, is rotatably mounted upon the rod 64 at a point thereon above the port 62. A moon rod 130 is attached to said bearing and curves out around earth-simulating globe 65. A moon-simulating sphere 131 is attached to the end of rod 130 at a position opposite the equator of globe 65. A bar 132 in the shape of an inverted U is affixed to gear 118 and is adapted to rotate therewith. The bar 132 is of sufficient length to make contact with the projection 129, causing bearing 128 to rotate upon rod 64 in conformity with the rotation of gear 118. The train of gears described in the preceding paragraph translates the annual rotation of gear 124 in such proportion as to cause bearing 128, and consequently to cause the moon-simulating sphere 131, to revolve about globe 65 at the rate of 235 times in 19 years. This is, for all practical purposes and with a negligible discrepancy, the actual rate of revolution of the moon about the earth.

A solid end piece 133 joins platform 2a and bar 51', and a calendar box 134 is bolted to this end piece. A rod 135 extends through the end piece and the end wall of the box and is joined within the box to one end of a lever 136 by means of a bar 137. The lever is on the outside of the box, and one end thereof is adapted to slide back and forth in a slot 138 in the side wall of the box. The other end of rod 135 is adapted to make contact with a pin 139 in gear 61, said pin being so located upon the gear as to push in upon rod 135 at twelve o'clock midnight, solar time, in the daily rotation of the gear. The other end of the lever 136 is a pawl 140 which is adapted to engage one of four studs 141 upon a circular plate 142 outside the calendar box. The circular plate is fixed to a shaft 143 journalled in the side walls of the box. A drum 144 is mounted within the calendar box upon shaft 143 and is rotatable therewith. A similar drum 145 is also located within the calendar box and is mounted upon shaft 146.

A roll of paper 147 bearing the days and months of the year is wound upon drum 145, and the end of the paper is passed over drum 144. The intelligence upon said paper can be read through an aperture 148 in the top of the calendar box above said drum 144. The paper, passing around drum 144 is rewound upon a drum 149 on shaft 150 which is held in frictional contact with the paper on drum 145 by a connector 151. A leaf spring 152 is in contact with bar 137 and is adapted to return said bar to its original position.

My calendar mechanism is extremely simple in operation. Once a day, gear 61 rotates, and at twelve midnight, solar time, pin 139 thereon pushes upon rod 135 to cause pawl 140 to engage with one of the studs 141 on the circular plate 142. As the pin passes on, it releases rod 135, and spring 152, pressing against bar 137, returns the rod to its normal position. At the same time, the lever is returned to its original position, pulling with it stud 141, which rotates the circular plate, and consequently drum 144, a quarter of a turn. This exposes to view a new date in the aperture 148 at the top of the calendar box. The old date automatically winds upon the smaller drum 149, which is frictionally rotated by reason of its contact with the supply drum 145. I prefer to provide the roll of paper with perforations upon its edges and to provide the drums with teeth for engaging the same in order to prevent slipping.

As the platform 2a, upon which the motor 5 is supported, revolves, provision must be made for bringing the wires into the same to avoid twisting them. I therefore prefer to carry the wires into my device through the rotational axis of the same. I provide an orifice 153 in the base 2 in alignment with a vertical orifice 154 in shaft 103. The shaft is non-rotatable and is provided with a collar 155 having a horizontal orifice therein which communicably connects with the vertical orifice in the shaft. Similarly, shaft 52 is provided with an orifice 157 which communicates with a brush box 158. The brush box is suspended from bar 51 at its axis of rotation and is of conventional design. Wires lead therefrom to the motor. It will be apparent that the orifices 153, 156, and 157 combine to form a non-rotatable channel for bringing wires from the outside into the brush box 158.

The brush box is attached to shaft 52 and is stationary therewith, being insulated by a plate 159 of non-conductive material. A bushing 160 surrounds shaft 52 and, being attached to bar 51, rotates with it around the stationary shaft. Two copper rings 161 and 162 are around bushing 160 but are separated therefrom by insulation 163. The wires carried into the box are attached to two brushes 164 and 165, and these brushes respectively energize the copper rings 161 and 162. Wires are similarly led from the rings through an orifice 166 at the top of the brush box and through a port in platform 2a to the motor.

My improved invention has the advantage over the prior art of providing a device which accurately represents the movement of the earth in its orbit about the sun. Corrections have been made for the various phenomena which feature this movement, so that the device is particularly useful as an educational instrument for the study of astronomy.

Although the present invention has been described in connection with a preferred embodiment, variations and modifications may be resorted to as those skilled in the art will understand. Such variations and modifications are considered to be within the scope of the present specification and the purview of the appended claims.

I claim:

1. In a tellurian, the combination which comprises a sun-simulating sphere, an earth-simulating globe adapted to revolve about said sphere and its own axis, constant speed driving means for rotating said globe about its axis, driving means for causing said globe to revolve about said sphere connected to said constant speed driving means, and a variable ratio transmission mechanism intermediate to said constant speed driving means and said means for causing said globe to revolve about the sphere, which mechanism proportions the rate of rotation of said globe about its axis to that of the globe about the sphere, in simulation of the corresponding movement of the earth relative to the sun.

2. In a tellurian, the combination which comprises a casing, a stationary sun-simulating sphere in proximity to the center of said casing, an earth-simulating globe adapted to be displaced around the periphery of said casing and to revolve about said sphere and its own axis, constant speed driving means for rotating said globe about its axis, driving means for causing said globe to revolve about said sphere connected to said constant speed driving means, a variable ratio transmission mechanism intermediate to said constant speed driving means and said means for causing said globe to revolve about the sphere, and means for varying the transmission ratio of said mechanism, which mechanism proportions the rate of rotation of said globe about its axis to that of the globe about the sphere, in simulation of the corresponding movement of the earth relative to the sun.

3. In a tellurian, the combination which comprises a casing, a stationary sun-simulating light-emitting sphere eccentrically mounted with respect to said casing, a reflector member to restrict emission of light from said member to a single direction, an earth-simulating globe adapted to be displaced around the periphery of said casing and to revolve about said sphere and its own axis, constant speed driving means for rotating said globe about its axis; driving means for causing said globe to revolve about said sphere connected to said constant speed driving means, a variable ratio transmission mechanism intermediate to said constant speed driving means and said means for causing said globe to revolve about the sphere, means for varying the transmission ratio of said mechanism, which mechanism proportions the rate of rotation of said globe about its axis to that of the globe about the sphere, in simulation of the corresponding movement of the earth relative to the sun, and means operable by the displacement of said globe around the periphery of said casing to rotate said reflector member around said light-emitting sphere whereby light emitted by said sphere will be projected onto the surface of said globe facing said sphere and will indicate the distribution of day and night thereon.

4. In a tellurian, the combination which comprises a casing, a stationary sun-simulating sphere mounted in proximity to the center of said casing, an earth-simulating globe mounted on a shaft adapted to be displaced around the periphery of said casing and to revolve about said sphere and about said shaft, constant speed driving means for rotating said globe about its shaft, driving means for causing said globe to revolve about said sphere connected to said constant speed driving means, a variable ratio transmission mechanism intermediate to said constant speed driving means and said means for causing said globe to revolve about the sphere, means for varying the transmission ratio of said mechanism, which mechanism proportions the rate of rotation of said globe about its shaft to that of the globe about the sphere, in simulation of the corresponding movement of the earth relative to the sun, a moon-simulating element rotatable about the shaft of said globe, and a gear train intermediate to said shaft and said element, to simulate the travel of the moon about the earth.

5. In a tellurian, the combination which comprises a substantially circular casing, a sun-simulating sphere mounted in proximity to the center of said casing, an earth-simulating globe mounted on a shaft inclined with respect to the axis of said casing adapted to be displaced around the periphery of said casing and to revolve about said sphere and about said shaft, constant speed driving means for rotating said globe about its shaft, driving means for causing said globe to revolve about said sphere connected to said constant speed driving means, a variable ratio transmission mechanism intermediate to said constant speed driving means and said means for causing said globe to revolve about the sphere, means for varying the transmission ratio of said mechanism, which mechanism proportions the rate of rotation of said globe about its shaft to that of the globe about the sphere, in simulation of the corresponding movement of the earth relative to the sun, and means under the control of said mechanism for varying the angle of said shaft with respect to the plane of said casing, to simulate variations of the tilting of the axis of the earth with respect to the plane of its orbit during the solar year.

6. In a tellurian, the combination which comprises a casing having an annular rack thereon, a stationary sun-simulating sphere eccentrically mounted with respect to said casing, a carriage displaceable on said rack and holding a rotatably mounted inclined shaft with an earth-simulating globe thereon, constant speed driving means including a synchronous motor and a gear train for displacing said carriage on said rack to revolve said globe about said sphere, driving means for transmitting rotation to the shaft of said globe to cause said globe to rotate about its axis, and a cam-controlled variable ratio transmission mechanism intermediate to said constant speed driving means and said means for causing said globe to revolve about its own axis, which mechanism proportions the rate of rotation of said globe about its axis to that of the globe about the sphere, in simulation of the corresponding movement of the earth relative to the sun.

7. In a tellurian, the combination which comprises a casing having an annular rack thereon, a stationary sun-simulating sphere eccentrically mounted with respect to said casing, a carriage displaceable on said rack, a rotatable member on said carriage rotationlessly but pivotably holding a shaft with an earth-simulating globe thereon, constant speed driving means including a gear train for displacing said carriage on said rack to cause said globe to revolve about the sphere, driving means intermediate to said gear train and said rotatable member to transmit rotation to said shaft and thereby to rotate said globe about its axis, a variable ratio transmission mechanism intermediate to said constant speed driving means and said last-named driving means, which mechanism proportions the rate of rotation of said globe about its axis to that of the globe about the sphere, in simulation of the corresponding movement of the earth relative to the sun, and tilting means operable by the displacement of said carriage to change the inclination of said globe-supporting shaft in conformity with the periodical variations in the inclination of the earth's axis.

8. In a tellurian, the combination which comprises a casing with a circular rack thereon, a stationary sun-simulating sphere eccentrically mounted with respect to said casing, a carriage displaceable on said rack, a rotatable member on said carriage rotationlessly but pivotably holding a shaft with an earth-simulating globe thereon, constant speed driving means including a gear train for displacing said carriage on said rack to cause said globe to revolve about the sphere, driving means intermediate to said gear train and said rotatable member to transmit rotation to said shaft and to rotate said globe about its axis, a variable ratio transmission mechanism intermediate to said constant speed driving means and said other driving means, which mechanism proportions the rate of rotation of said globe about its axis to that of the globe about the sphere, in simulation of the corresponding movement of the earth relative to the sun, and means responsive to the movement of the carriage to cause relative displacement of said globe-supporting shaft with respect to said carriage thereby to convert circular motion of the carriage to displacement of said globe along an elliptical path.

9. In a tellurian, the combination which comprises a casing with a substantially circular rack thereon, a stationary sun-simulating sphere eccentrically mounted with respect to said casing, a carriage displaceable on said rack, a rotatable member on said carriage rotationlessly holding a shaft with an earth-simulating globe thereon but permitting displacement of said shaft with respect to the carriage, constant speed driving means including a gear train for displacing said carriage on said rack to cause said globe to revolve about the sphere, driving means intermediate to said gear train and said rotatable member to transmit rotation to said shaft and to rotate said globe about its axis, a variable ratio transmission mechanism intermediate to said constant speed driving means and said last-named driving means, which mechanism proportions the rate of rotation of said globe about its axis to that of the globe about the sphere, in simulation of the movement of the earth relative to the sun, and means including an elliptical cam responsive to the movement of said carriage to cause relative displacement of said globe-supporting shaft with respect to said carriage whereby said globe will travel along a generally elliptical path around said sphere while said carriage travels on a circular path.

ANGELO BARBAGELATA.